(12) United States Patent
Zia et al.

(10) Patent No.: US 12,033,142 B2
(45) Date of Patent: Jul. 9, 2024

(54) AUTHENTICATOR APP FOR CONSENT ARCHITECTURE

(71) Applicant: Google LLC, Mountain View, CA (US)

(72) Inventors: Hannia Zia, Mountain View, CA (US); Heman Khanna, Mountain View, CA (US); Animesh Chatterji, Mountain View, CA (US); Stavan Parikh, Mountain View, CA (US); Ridhima Kedia, Mountain View, CA (US); Bogdan Brinzarea Iamandi, Mountain View, CA (US)

(73) Assignee: Google LLC, Mountain View, CA (US)

(*) Notice: Subject to any disclaimer, the term of this patent is extended or adjusted under 35 U.S.C. 154(b) by 203 days.

(21) Appl. No.: 17/633,509

(22) PCT Filed: Aug. 21, 2019

(86) PCT No.: PCT/US2019/047399
§ 371 (c)(1),
(2) Date: Feb. 7, 2022

(87) PCT Pub. No.: WO2021/034322
PCT Pub. Date: Feb. 25, 2021

(65) Prior Publication Data
US 2022/0300962 A1    Sep. 22, 2022

(51) Int. Cl.
*G06Q 20/38* (2012.01)
*G06Q 20/32* (2012.01)
(Continued)

(52) U.S. Cl.
CPC ............... *G06Q 20/38215* (2013.01); *G06Q 20/3227* (2013.01); *G06Q 20/326* (2020.05);
(Continued)

(58) Field of Classification Search
CPC ........... G06Q 20/38215; G06Q 20/326; G06Q 20/3227; G06Q 20/4014; G06Q 2220/00; H04L 9/0825; H04L 2209/56
See application file for complete search history.

(56) References Cited

U.S. PATENT DOCUMENTS 8,316,237 B1 * 11/2012 Felsher ................. H04L 63/061
380/282
10,817,875 B2 * 10/2020 Makhotin ............ G06Q 20/326
(Continued)

FOREIGN PATENT DOCUMENTS

KR    10-2011-0123201 A    11/2011
KR    10-2016-0024162 A    3/2016
(Continued)

OTHER PUBLICATIONS

Japanese Office Action for the related Application No. 2022-510912, dated May 30, 2023, 6 pages.
(Continued)

*Primary Examiner* — Hosuk Song
(74) *Attorney, Agent, or Firm* — Honigman LLP; Brett A. Krueger

(57) ABSTRACT

A method 1000 for authenticating operations within consent architecture includes obtaining an operation request 142 requesting a service application 140 to access a remote entity 130 to perform an operation (138). The method also includes issuing, by the service application, an authentication request 152 requesting an authenticator application 150 to obtain user authentication credentials 154 for authenticating a user 12 before the remote entity performs the operation. The method also includes encrypting, by the authenticator application, the obtained user authentication credentials using a public key 132 of the remote entity. The service application is restricted from obtaining the user authentication credentials in unencrypted form. The method (Continued)

also includes providing, by the authenticator application, the encrypted user authentication credentials to the service application and transmitting, by the service application, the operation request and the encrypted user authentication credentials to the remote entity.

34 Claims, 11 Drawing Sheets

(51) Int. Cl.
    *G06Q 20/40*         (2012.01)
    *H04L 9/08*          (2006.01)

(52) U.S. Cl.
    CPC ....... *G06Q 20/4014* (2013.01); *H04L 9/0825* (2013.01); *G06Q 2220/00* (2013.01); *H04L 2209/56* (2013.01)

(56) References Cited

U.S. PATENT DOCUMENTS

| | | | |
|---|---|---|---|
| 11,068,881 B2 * | 7/2021 | Beye | G06Q 20/0457 |
| 11,310,052 B1 * | 4/2022 | Keogh | H04L 9/3239 |
| 11,416,855 B2 * | 8/2022 | Fiske | G06Q 20/326 |
| 11,488,136 B2 * | 11/2022 | Sharp | H04W 12/069 |
| 11,647,023 B2 * | 5/2023 | Avetisov | G09C 5/00 726/6 |
| 2013/0060701 A1 | 3/2013 | Moon et al. | |
| 2015/0019443 A1 | 1/2015 | Sheets et al. | |
| 2015/0052064 A1 | 2/2015 | Karpenko et al. | |
| 2017/0357967 A1 | 12/2017 | Sykora et al. | |

FOREIGN PATENT DOCUMENTS

| | | |
|---|---|---|
| KR | 10-2018-0039470 A | 4/2018 |
| KR | 10-2019-0009862 A | 1/2019 |
| WO | 2015009765 A1 | 1/2015 |

OTHER PUBLICATIONS

International Search Report and Written Opinion for PCT Application No. PCT/US2019/047399, dated May 7, 2020.
Office Action issued in related Korean Patent Application No. 10-2022-7005554, dated Mar. 15, 2024.

* cited by examiner

AUTHENTICATOR APP FOR CONSENT ARCHITECTURE

CROSS-REFERENCE TO RELATED APPLICATION

This patent application claims priority under 35 U.S.C. § 120 from International Patent Application No. PCT/US2019/047399, filed on Aug. 21, 2019, which is hereby incorporated by reference in its entirety.

TECHNICAL FIELD

This disclosure relates to a cross-application authenticator application for secure authentication for any number of applications.

BACKGROUND

Real time payments (RTPs) are financial transactions that allow payees to receive payment within seconds (i.e., in "real time") of the sending financial institution initiating the transaction. These payment systems are often maintained by an RTP network, which is typically a central authority that facilitates money across issuers similarly to credit card networks that handle interchange and settlements. RTPs are often conducted via user devices (e.g., mobile phones) executing payment applications (apps) to instantly transfer money from one user's account at a financial institution to another user's account at a different or same financial institution. These payment apps usually gain access to the RTP network via application programming interfaces (APIs). RTPs have greatly increased in popularly, and as the number of transactions has soared, the number of competing payment applications has likewise increased. It is not unusual for a user to have multiple independent payment apps on the same user device, each payment app authorized to access one or more of the user's accounts.

SUMMARY

One aspect of the disclosure provides a method of authenticating operations within consent architecture. The method includes obtaining, at data processing hardware of a user device executing a service application and an authenticator application, an operation request requesting the service application to access a remote entity to perform an operation. The operation request includes a remote entity identifier identifying the remote entity and operation information associated with the operation. The method also includes issuing, by the service application executing on the data processing hardware, an authentication request requesting the authenticator application to obtain user authentication credentials of a user of the user device associated with the remote entity for authenticating the user before the remote entity performs the operation. The method also includes encrypting, by the authenticator application executing on the data processing hardware, the obtained user authentication credentials using a public key of the remote entity so that the service application is restricted from obtaining the user authentication credentials in unencrypted form. The method also includes providing, by the authenticator application executing on the data processing hardware, the encrypted user authentication credentials to the service application and transmitting, by the service application executing on the data processing hardware, to the remote entity, the operation request and the encrypted user authentication credentials.

The operation request and the encrypted user authentication credentials when received by the remote entity causes the remote entity to decrypt the encrypted user authentication credentials using a private key of the remote entity and validate the decrypted user authentication credentials.

Implementations of the disclosure may include one or more of the following optional features. In some implementations, the service application includes a payment application and the remote entity includes a financial institution associated with the user. The operation request requesting the service application to access the remote entity includes an electronic payment request requesting the payment application to initiate an electronic payment from the financial institution to a payee. In some examples, the operation information includes at least one of a description of the electronic payment, a value/amount of the electronic payment, at least a portion of a unique account identifier identifying an account associated with the user at the financial institution, or a payee identifier identifying the payee.

Optionally, the remote entity includes a records datastore storing private information associated with the user and the operation request requesting the service application to access the remote entity includes an information retrieval request requesting the service application to retrieve at least some of the private information from the records datastore. The private information may include private records associated with the user. The private information may be information that the user wishes to keep confidential or is information for which a service provider has obligations to keep confidential. In some implementations, the method further includes, after encrypting the obtained user authentication credentials using the public key of the remote entity, re-encrypting, by the authenticator application executing on the data processing hardware, the encrypted user authentication credentials using a public key associated with a verification network of the remote entity.

In some examples, the method further includes, after encrypting the obtained user authentication credentials using the public key of the remote entity, signing, by the authenticator application executing on the data processing hardware, the encrypted user authentication credentials using a private key of the user device. A public key of the user device may be registered with the remote entity. The public key of the user device corresponds to the private key of the user device and is used by the remote entity to verify the signature of the encrypted user authentication credentials. Optionally, encrypting the obtained user authentication credentials using the public key of the remote entity further includes encrypting the operation request and the user authentication credentials together using the public key of the remote entity.

In some implementations, the method further includes, prior to encrypting the obtained user authentication credentials, issuing, by the authenticator application executing on the data processing hardware, a user device unlock challenge to the user. The authentication request issued by the service application may include an authorization token that the authenticator application uses to validate the service application prior to obtaining the user authentication credentials.

Optionally, the method further includes, after transmitting the operation request and the encrypted user authentication credentials to the remote entity, receiving, at the service application executing on the data processing hardware, a challenge request from the remote entity. The challenge request requests additional user authentication credentials from the user. The method may also include invoking, by the service application executing on the data processing hardware, the authenticator application to obtain the additional user authentication credentials from the user and encrypting, by the authenticator application executing on the data processing hardware, the obtained additional user authentication credentials using the public key of the remote entity. The method may also include providing, by the authenticator application executing on the data processing hardware, the encrypted additional user authentication credentials to the service application and transmitting, by the service application executing on the data processing hardware, a challenge response including the encrypted additional user authentication credentials to the remote entity. The challenge response, when received by the remote entity, causes the remote entity to decrypt the encrypted additional user authentication credentials using the private key of the remote entity and validate the decrypted additional user authentication credentials.

In some examples, the remote entity is configured to perform an operation based on the operation request after validating both the decrypted user authentication credentials and the decrypted additional user authentication credentials. The remote entity may be configured to transfer an electronic payment to a payee after validating the decrypted user authentication credentials.

In some examples, the method further includes binding, by the authenticator application executing on the data processing hardware, an identity of the user to the user device. The binding may include receiving a service registration request from the service application executing on the data processing hardware. The service registration request includes a user identification and a service application identification. The user identification uniquely identifies the user to the service application and the service application identification s uniquely identifies the service application to the authenticator application. The binding may also include generating a device bound key pair. The device bound key pair includes a device public key and a device private key based on the user identification and the service application identification. The binding may also include signing the service application identification with the device private key and sending the device public key and the signed service application identification to the remote entity.

In some implementations, the method further includes binding, by the authenticator application executing on the data processing hardware, a user account associated with the user and the remote entity with the user device. The binding may include signing the service application identification with the device private key and sending the signed service application identification a to the service application executing on the data processing hardware. The signed service application identification when received by the service application causes the service application to send the signed service application identification and an account identification to the remote entity. The account identification uniquely identifying the user account.

In some examples, the method further includes, when executing the service application and the authenticator application, executing, by the data processing hardware, one or more additional service applications. Each additional service application may be configured to receive a corresponding operation request requesting the additional service application to access the same remote entity or a different remote entity to perform a corresponding operation. Each additional service application may also be configured to issue a corresponding authentication request requesting the authenticator application to obtain the user authentication credentials of the user for authenticating the user before the same remote entity or a different remote entity performs the operation and receive the encrypted user authentication credentials from the authenticator application so as to restrict the additional service application from obtaining the user authentication credentials in unencrypted form.

Another aspect of the disclosure provides a system for authenticating operations within consent architecture. The system includes data processing hardware of a user device executing a service application and an authenticator application and memory hardware in communication with the data processing hardware. The memory hardware stores instructions that when executed on the data processing hardware cause the data processing hardware to perform operations.

The operations include obtaining an operation request requesting the service application to access a remote entity to perform an operation. The operation request includes a remote entity identifier identifying the remote entity and operation information associated with the operation. The operations also include issuing, by the service application, an authentication request requesting the authenticator application to obtain user authentication credentials of a user of the user device associated with the remote entity for authenticating the user before the remote entity performs the operation. The operations also include encrypting, by the authenticator application, the obtained user authentication credentials using a public key of the remote entity so that the service application is restricted from obtaining the user authentication credentials in unencrypted form. The operations also include providing, by the authenticator application, the encrypted user authentication credentials to the service application and transmitting, by the service application, to the remote entity, the operation request and the encrypted user authentication credentials. The operation request and the encrypted user authentication credentials when received by the remote entity causes the remote entity to decrypt the encrypted user authentication credentials using a private key of the remote entity and validate the decrypted user authentication credentials.

This aspect may include one or more of the following optional features. In some implementations, the service application includes a payment application and the remote entity includes a financial institution associated with the user. The operation request requesting the service application to access the remote entity includes an electronic payment request requesting the payment application to initiate an electronic payment from the financial institution to a payee. In some examples, the operation information includes at least one of a description of the electronic payment, a value/amount of the electronic payment, at least a portion of a unique account identifier identifying an account associated with the user at the financial institution, or a payee identifier identifying the payee.

Optionally, the remote entity includes a records datastore storing private information associated with the user and the operation request requesting the service application to access the remote entity includes an information retrieval request requesting the service application to retrieve at least some of the private information from the records datastore. The private information may include private records associated with the user. In some implementations, the operations further include, after encrypting the obtained user authentication credentials using the public key of the remote entity, re-encrypting, by the authenticator application, the encrypted user authentication credentials using a public key associated with a verification network of the remote entity.

In some examples, the operations further include, after encrypting the obtained user authentication credentials using the public key of the remote entity, signing, by the authenticator application, the encrypted user authentication credentials using a private key of the user device. A public key of the user device may be registered with the remote entity. The public key of the user device corresponds to the private key of the user device and is used by the remote entity to verify the signature of the encrypted user authentication credentials. Optionally, encrypting the obtained user authentication credentials using the public key of the remote entity further includes encrypting the operation request and the user authentication credentials together using the public key of the remote entity.

In some implementations, the operations further include, prior to encrypting the obtained user authentication credentials, issuing, by the authenticator application, a user device unlock challenge to the user. The authentication request issued by the service application may include an authorization token that the authenticator application uses to validate the service application prior to obtaining the user authentication credentials.

Optionally, the operations further include, after transmitting the operation request and the encrypted user authentication credentials to the remote entity, receiving, at the service application, a challenge request from the remote entity. The challenge request requests additional user authentication credentials from the user. The operations may also include invoking, by the service application, the authenticator application to obtain the additional user authentication credentials from the user and encrypting, by the authenticator application, the obtained additional user authentication credentials using the public key of the remote entity. The operations may also include providing, by the authenticator application, the encrypted additional user authentication credentials to the service application and transmitting, by the service application, a challenge response including the encrypted additional user authentication credentials to the remote entity. The challenge response, when received by the remote entity, causes the remote entity to decrypt the encrypted additional user authentication credentials using the private key of the remote entity and validate the decrypted additional user authentication credentials.

In some examples, the remote entity is configured to perform an operation based on the operation request after validating both the decrypted user authentication credentials and the decrypted additional user authentication credentials. The remote entity may be configured to transfer an electronic payment to a payee after validating the decrypted user authentication credentials.

In some examples, the operations further includes binding, by the authenticator application, an identity of the user to the user device. The binding may include receiving a service registration request from the service application. The service registration request includes a user identification and a service application identification. The user identification uniquely identifies the user to the service application and the service application identification s uniquely identifies the service application to the authenticator application. The binding may also include generating a device bound key pair. The device bound key pair includes a device public key and a device private key based on the user identification and the service application identification. The binding may also include signing the service application identification with the device private key and sending the device public key and the signed service application identification to the remote entity.

In some implementations, the operations further includes binding, by the authenticator application, a user account associated with the user and the remote entity with the user device. The binding may include signing the service application identification with the device private key and sending the signed service application identification a to the service application. The signed service application identification when received by the service application causes the service application to send the signed service application identification and an account identification to the remote entity. The account identification uniquely identifying the user account.

In some examples, the operations further include, when executing the service application and the authenticator application, executing one or more additional service applications. Each additional service application may be configured to receive a corresponding operation request requesting the additional service application to access the same remote entity or a different remote entity to perform a corresponding operation. Each additional service application may also be configured to issue a corresponding authentication request requesting the authenticator application to obtain the user authentication credentials of the user for authenticating the user before the same remote entity or a different remote entity performs the operation and receive the encrypted user authentication credentials from the authenticator application so as to restrict the additional service application from obtaining the user authentication credentials in unencrypted form.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
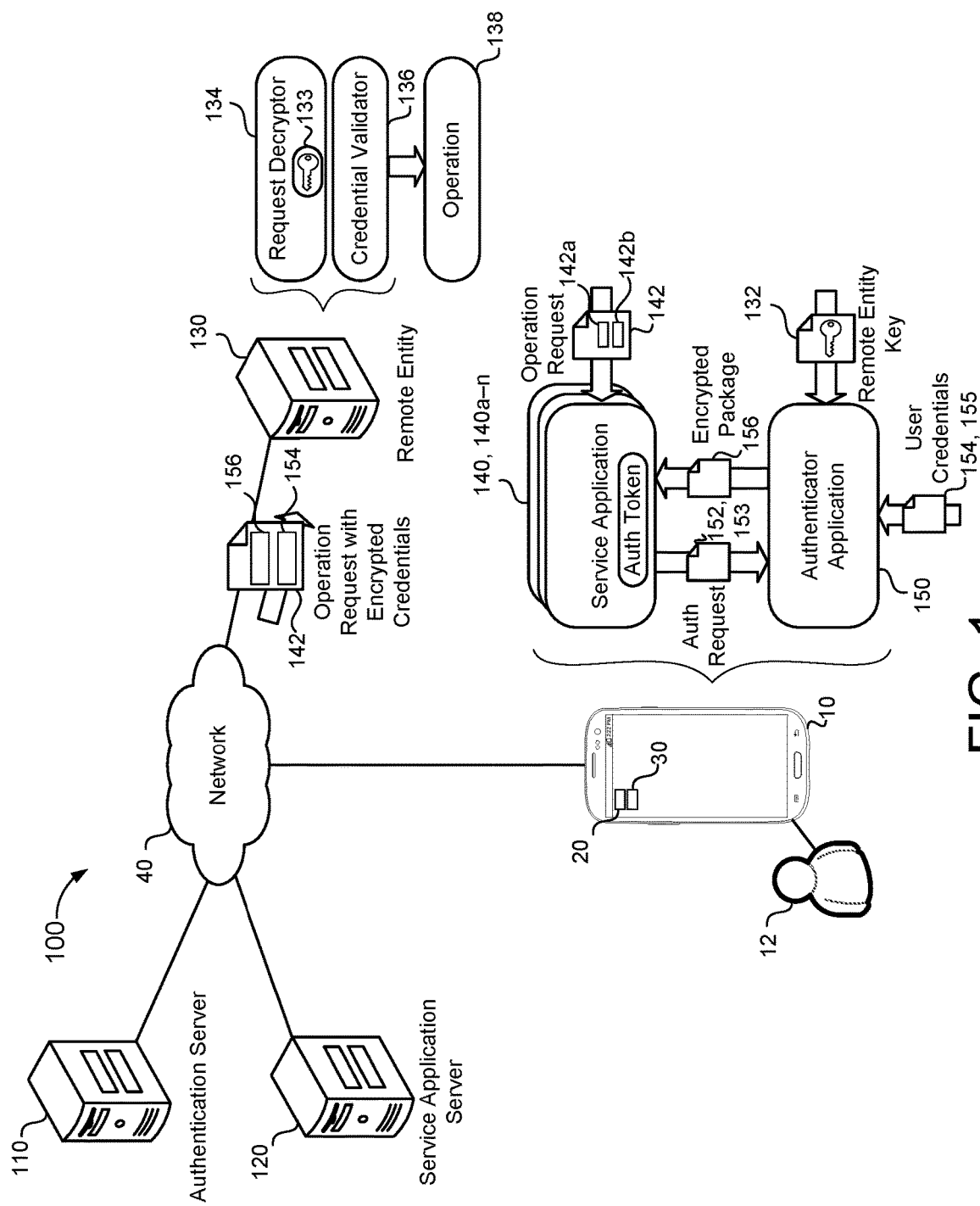
FIG. 1 is a schematic view of an example authenticator for a consent architecture system that provides secure authentication to a remote entity from a user device.

Service applications (such as applications for conducting real time payments (RTPs) or accessing sensitive information) will often need to provide user credentials to a remote entity that performs (or enables or participates in) the service being requested by the user. Such credentials (such as username, pin number, password, fingerprint data, etc.) are themselves sensitive information. If a malicious attacker is able, via a malicious service application or via a legitimate service application that has a security flaw/vulnerability, to access such credentials, then that attacker may be able to conduct unauthorized transactions or obtain unauthorized services in relation to not only that particular service application, but also potentially in relation to other service applications that that user may make use of. For example, if an attacker is able to obtain the user's credentials via a security vulnerability in a service application executing on a user's device that accesses person health records, then the attacker may also be able to use those credentials to conduct an unauthorized financial transaction via a payment application installed on the user's device. Protection and security measures implemented by a first service application may be negated, or made less effective, if a second service application (over which the developers of the first service application have no control) is implemented in a less secure way.

With that in mind, the present invention provides an authenticator application that executes alongside one or more service applications. As discussed in more detail later, the authenticator application may, in response to a request from a service application, obtain credentials of a user, encrypt those credentials using a public key of a remote entity (that is to perform or provide a desired service associated with the requesting service application), and provide those encrypted credentials back to the service application. The service application does not, itself, obtain the user credentials from the user. The service application is, therefore, prevented from accessing the credentials of the user (as service application does not have the remote entity's private key that is needed to decrypt the encrypted credentials). An attacker cannot therefore make use of a malicious service application, or a security vulnerability in another service application, to access and misuse the user's credentials.

Moreover, the ability of multiple service applications to make use of the same authenticator application in this way provides various further technical benefits. In particular, the use of such an authenticator application allows for a quicker and easier way of performing a security update—updating the authenticator application provides updated security for all of the service applications that make use of the authenticator application (as opposed to having to perform an update on each and every service application). Furthermore, memory on the user's device is more effectively utilized—the size of the service applications ends up being reduced as they no longer themselves need to have their own functionality for obtaining the user's credentials via the user interface of the device and then securing those credentials. This benefit is enhanced as more and more service applications make use of the authenticator application.

Implementations herein are directed toward a system for providing consent architecture that includes an authenticator application that provides secure authentication to a service application (e.g., a payment application) for use with a remote entity (e.g., a financial institution). When obtaining an operation request from the service application, the authenticator application verifies that both the device and the user are authentic before providing encrypted authentication credentials to the service application. The service application then provides the encrypted credentials to the remote entity, which verifies the credentials. Thus, the service application never receives unencrypted credentials and the user may only provide some credentials a single time to the authenticator application independent of the number of service applications used.

Referring to FIG. 1, in some implementations, an example system 100 includes a user device 10 associated with a respective user 12 and in communication with a remote authentication system 110 (herein also referred to as a authentication server), a remote service application system 120 (herein also referred to as a service application server), and a remote entity system 130 (herein also referred to just as the remote entity) via a network 40. The user device 10 may correspond to any computing device, such as a desktop workstation, a laptop workstation, or a mobile device (i.e., a smart phone). The remote systems 110, 120, 130 may be a single computer, multiple computers, or a distributed system (e.g., a cloud environment) having scalable/elastic computing resources (e.g., data processing hardware) and/or storage resources (e.g., memory hardware).

The user device 10 (e.g., a mobile phone) associated with the user 12 may include associated memory hardware 20 and associated data processing hardware 30. The user device 10 leverages the memory hardware 20 and data processing hardware 30 to store and execute one or more service applications 140, 140a—n (also referred to as a service app). In some examples, the service application 140 is a payment application that facilitates transferring funds in real-time from an account of a payer (i.e., a user account of the user 12) to a payee, as described in more detail below. The service application 140 may execute as a standalone program on the user device 10 or, for example, in a web browser. The service application 140 obtains, receives, and/or generates an operation request 142. The operation request 142 is generally created in response to user action. For example, when the service application 140 is a payment application, the user 12 may initiate an operation request 142 by attempting to transmit funds through the payment application. In some examples, the service application 140 generates the operation request 142 in response to commands from the user 12. In other examples, the service application 140, through the network 40, communicates with the service application server 120 and the service application server 120 generates the operation request 142 and sends the operation request 142 to the service application 140.

Figure 3:
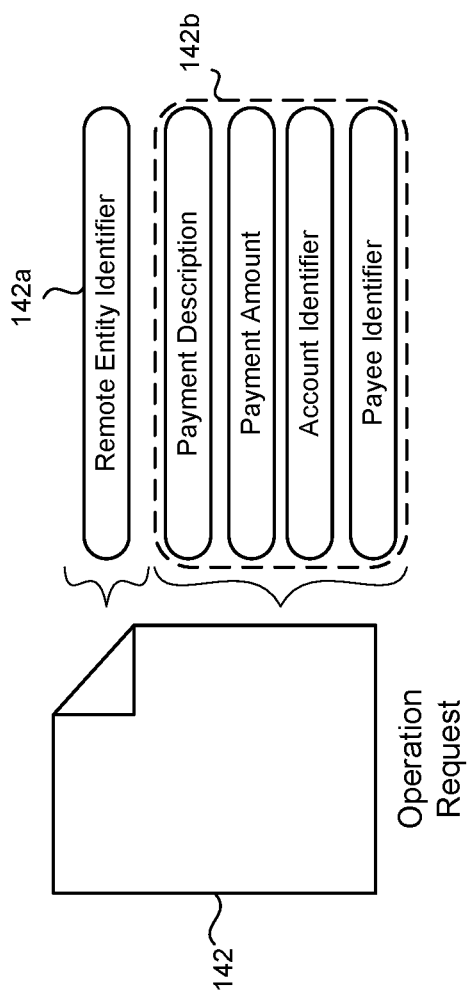
FIG. 3 is a schematic view of an operation request.

The operation request 142 includes a remote entity identifier 142a along with additional operation information 142b associated with the operation. The remote entity identifier 142a identifies the remote entity 130 associated with the operation request 142. For example, the remote entity identifier 142a may be a name or other unique identifier of the financial institution the user 12 has associated with the service application 140. The operation information 142b may include a host of information necessary or helpful for conducting the operation (FIG. 3). For example, when the operation request 142 involves a financial transaction, the operation information 142b may include a description of the financial payment, any value or amount associated with the payment, at least a portion of a unique identifier that identifies an account of the user associated with the remote entity, and/or a payee identifier that identifies the payee.

The user device 10 also executes an authenticator application 150. As used herein, the authenticator application 150 may also be referred to as the authenticator app, authentication application, or authentication app. The authenticator application 150 receives an authentication request 152 from the service application 140. The authentication request 152 requests that the authenticator application 150 obtain user authentication credentials 154 associated with the remote entity 130 in order to authenticate the user 12 prior to the remote entity 130 performing an operation 138 associated with the operation request 1402.

The user 12 provides user credentials 154 for one or more remote entities 130 (e.g., financial institutions) to the authenticator application 150. That is, the user 12 provides the authenticator application 150 with the credentials 154 necessary to access an account 137 (FIG. 2) of the user 12 at a remote entity 130. The user 12 may provide separate credentials 154 for any number of remote entities 130. Put another way, the user may "register" any number of user accounts with any number of remote entities 130 with the authenticator application 150. The user credentials 154 may be a username and password, a personal identification number (PIN), one-time password (OTP), a unique device key, or any other data the remote entity 130 requires for authentication or cryptographic attestation (i.e., a claim that can be cryptographically verified). In some examples, the user 12 registers a single account from the remote entity 130 with the authenticator application 150, while in other examples, the user 12 registers all accounts associated with the remote entity 130 simultaneously.

In addition to receiving user credentials 154 from the user 12 for a respective remote entity 130, the authenticator application 150 retrieves a public key 132 associated with the respective remote entity 130. The public key 132 makes up one of the keys in a key pair used in public-key cryptography (also referred to as asymmetric cryptography). In public-key cryptography, cryptographic algorithms generate a private key and a corresponding public key that produce one-way functions such that data encrypted with the public key may only be decrypted by the associated private key. In this example, the remote entity 130 publically provides its public key 132 and keeps hidden the associated private key 133. Thus, once the user credentials 154 are encrypted by the authenticator application 150 with the public key 132 of the remote entity 130, only the remote entity 130 (with the associated hidden private key 133) may decrypt the encrypted credentials 154. In this way, the service application 140 is restricted from obtaining the user authentication credentials 154 in unencrypted form.

In addition to encrypting the user credentials 154, the authenticator application 150 optionally encrypts additional information 155 with the credentials 154. For example, the authenticator application 150 may encrypt additional transaction details (e.g., transaction amount, account identification, description, etc.) along with other information such as a current timestamp and unique identification to form an encrypted package 156. As discussed in more detail below, this additional information 155 may serve to provide additional authentication and verification of the operation.

The authenticator application 150 provides the encrypted user package 156 to the service application 140. As previously discussed, the service application 140 lacks the private key 133 of the remote entity (i.e., the key associated with the public key 132 used to encrypt the user credentials 154) and thus cannot access the unencrypted credentials 154. The service application 140 transmits the operation request 142, now including the encrypted package 156, to the remote entity 130. The remote entity 130, decrypts the package 156 (including the encrypted credentials 154) from the received operation request 142 with a request decryptor 134 using the associated private key 133 and validates the decrypted credentials 154 with a credential validator 136.

Figure 2:
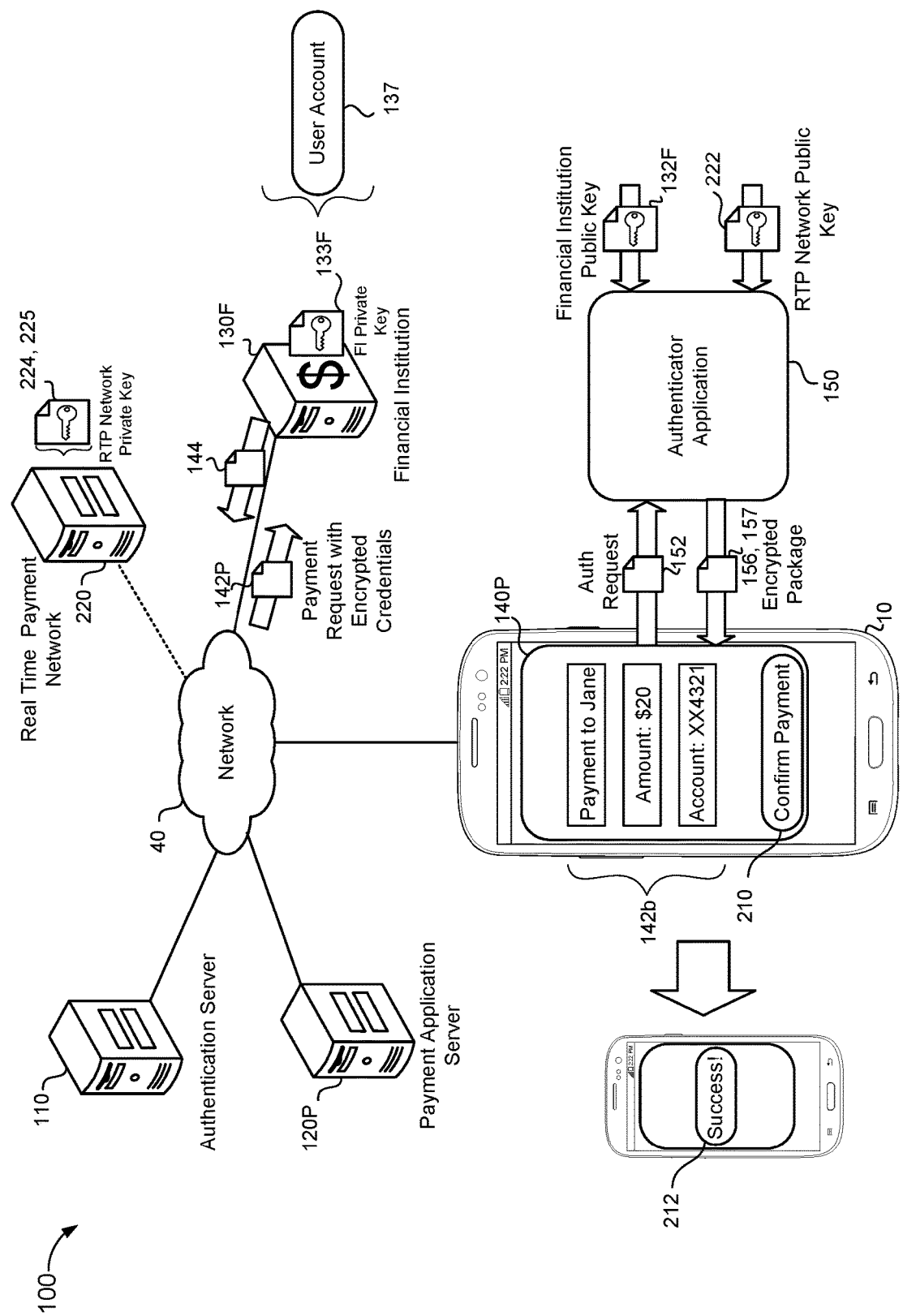
FIG. 2 is a schematic view of the authenticator of FIG. 1 that provides secure authentication of a payment application.

Referring now to FIG. 2, in some implementations, the system 100 includes the remote entity 130 including financial institution 130F associated with the user 12 and the service application 140 including a payment application 140P. In this case, the operation request 142 is an electronic payment request 142P requesting the payment application 140P to initiate the electronic payment from the financial institution to a payee. For example, the user device 10 may launch the payment application 140P to transfer funds to a payee. The payment application 140P typically asks for operation information 142*b* such as an identity of the payee, an amount of the transaction, and an account the user 12 wishes to draw the funds from. A payment confirmation from the user 12 (e.g., the user 12 pressing a "Confirm Payment" button 210) may initiate the authentication request 152 from the payment application 140P to the authenticator application 150.

Real time payment networks 220 (herein also referred to as verification networks) are maintained by some central authorities (e.g., governments of countries) to facilitate interbank retail payments. That is, RTP networks may act as a clearing house and settle funds across issuers in a similar fashion as credit card networks that handle interchange and settlements with credit card operations. For example, India maintains the National Payments of India that includes an immediate payment service that is a real time inter-bank payment system. Similarly, Mexico operates Banxico to maintain immediate payment services in Mexico. Generally, real time payments must be verified and/or authenticated by the RTP networks before the payment is approved. In some instances, the central authority (e.g., the government) does not provide a RTP network and instead all verification and authentication is left to the individual financial institutions. The RTP networks and/or financial institutions often provide access to the RTP network via application programming interfaces (APIs). For example, some RTP networks offer payment initiation service provider (PISP) APIs.

Still referring to FIG. 2, a real time payment network (RTP network) 220 may be in communication with network 40. The payment application 140P may be a non-financial institution that has access to the network 220 via APIs and is able to initiate payments. The payment application 140P, in some examples, is a standalone application, and in other examples, is executed in a web browser. In some implementations, the payment application 140P, after receiving the encrypted package 156 from the authenticator application 150, sends the package 156 to a payment application server 120P (or simply 'payment server 120P') along with the payment request 142P. The payment application server 120P is a computing entity that relays requests from the payment application 140P to the RTP network 220. The payment server 120P typically is authenticated by the RTP network 220. That is, the payment server 120P must prove to the RTP network 220 that the server 120P is a genuine server in service to the approved payment application 140P. Once authenticated, the payment server 120P forwards the received package 156 and request 142P to the RTP network 220.

As discussed in greater detail below, the RTP network 220 may perform a set of validations prior to approving the transaction. These validations may be in addition to any validations the financial institution 130F requires. To secure the RTP network operations, the authenticator application 150 may encrypt some or all of the credentials 154 with an RTP network public key 222. Like the remote entity public key 132 (i.e., the public key of the financial institution 130F), the RTP network public key 222 may be one of a pair of key used in public-key cryptography while the RTP network keeps an associated secret network private key 224.

In some implementations, the network 220 has a separate master signing key 225 used to establish authenticity of the RTP network 220. All data signed by this key may be verified using the corresponding master public key. For example, the authenticator app 150 may receive a Diffie-Hellman (DH) key from the network 220 signed by the master signing key 225 so that the authenticator app 150 may verify the authenticity of the DH key. The master public key may be hardcoded into the authenticator app 150, as it may have a very long expiration time. Some or all of the user credentials 154 may be encrypted with either or both the remote entity key 132 and the network key 222. When the credentials 154 are encrypted with both, the RTP network 220 may decrypt the encrypted package 156 using the network private key 224 prior to forwarding the package 156 and request 142P on to the remote entity 130 so that the remote entity 130 may decrypt and access its portion of the package 156.

After the financial institution 130F receives the payment request 142P from either the RTP network 220, the payment application server 120P, or, in some examples, directly from the payment application 140P, the financial institution 130F validates any operation information 142b included within the operation request 142. For example, the financial institution 130F may validate that the operation information 142b (e.g., transaction amount, account identification, etc.) from the operation request 142 matches the additional information 155 encrypted by the authenticator application 150. In some examples, the financial institution 140F verifies that a phone number associated with the mobile device that sent the request matches a phone number associated with the account being accessed. If the financial institution 140F desires (e.g., if the transaction is suspicious), the financial institution may issue one or more challenge requests 144 requesting additional user authentication credentials 154 to the user 12. Any challenge requests 144 from the financial institution 130F may be forwarded back through the RTP network 220 to the payment server 120P, the payment application 140P, and finally back to the authenticator application 150 where the authenticator app 150 may obtain and encrypt the obtained additional user authentication credentials 154 from the user 12 to satisfy the challenge request 144 with a challenge response 157 (FIG. 2). The financial institution 140F may similarly decrypt the encrypted additional user authentication credentials 154 from the challenge response 157 and validate the decrypted additional user authentication credentials 154 to satisfy the challenge request 144. Once the financial institution 130F accepts the transaction, the funds are transferred and the financial institution 130F may pass acknowledgement back to the RTP network 220, which in turn flows back to the user 12 as a notification 212. For example, the payment application 140P may display a visual indication of success and/or play audible message.

Figure 4:
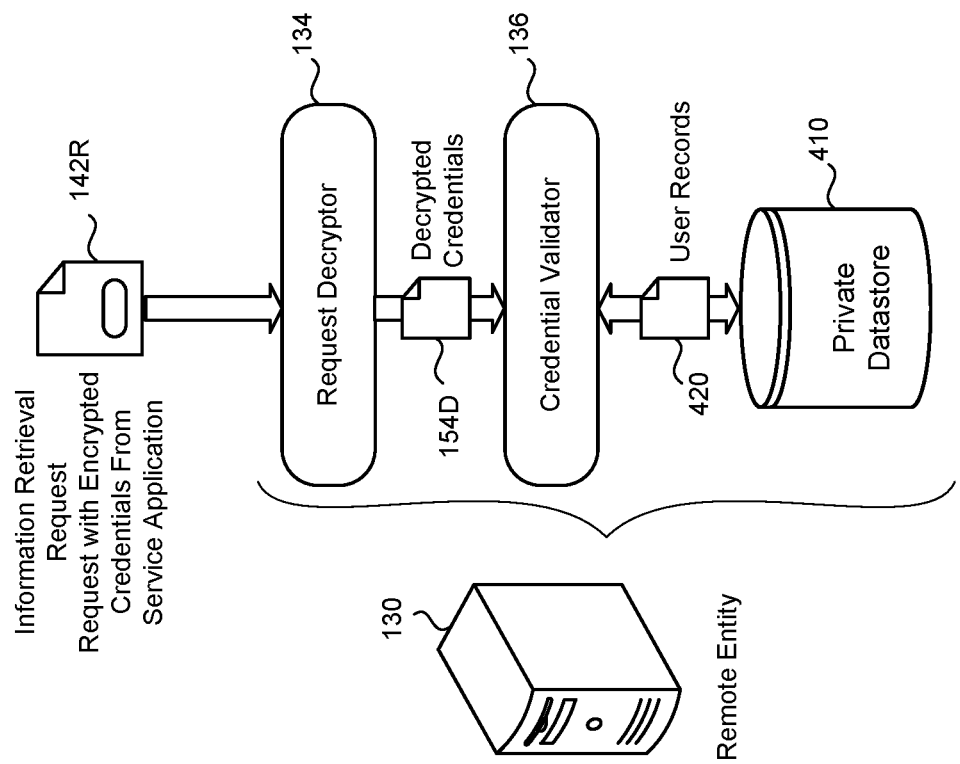
FIG. 4 is a schematic view of a remote entity with access to a private datastore.

While in the context of the previous example the service application 140 was described as a payment application 140P and the remote entity 130 was described as a financial institution 130F, the authenticator application 150 is applicable in any situation where the user 12 is transferring sensitive information via an untrusted third-party application to a remote entity. For example, the user 12 may initiate an information retrieval request 142R for records (e.g., private al records that the remote entity has an obligation to keep confidential) or other private information associated with the user from a private records datastore without exposing user credentials 154 in cleartext/plaintext. Referring now to FIG. 4, in some implementations, the authenticator application 150 encrypts user credentials 154 to enable access to a private records datastore 410 storing private information 420 associated with the user 12. The private datastore 410 may be an online repository of sensitive information (e.g., health records). The remote entity 130, after receiving the information retrieval request 142R from the service application 140, decrypts the encrypted package 156 at the request decryptor to obtain decrypted credentials 154D and validates the credentials at the credential validator 136. After successful validation, the remote entity 130 retrieves one or more user records 420 from the private records datastore 410 storing private information. The remote entity may return the retrieved records 420 to the user 12 via the user device 10 or, if authorized, transfer the records to a third-party. For example, the user 12 may authorize a private records company to transfer private records to a facility that requires the records without the service application 140 learning any information necessary to obtain the records (e.g., a social security number).

The authenticator application 150, service application 140, network 220, and remote entity 130, in some implementations, provide a secure environment by performing a set of standard validations at every application step. For example, every time the authentication app 150 receives a request from the service app 140, the authenticator app 150 may verify a service app identification (ID) (i.e., an identification that uniquely identifies the service app 140) and/or an authorization certificate or some other form of authorization token 153 from the service app 140. The service app 140, whenever communicating with the service app server 120, may verify the server's certificate (e.g., via x509 certificate signing). The service app server 120, in some examples, authenticates the service app user and authenticates to the network 220 using mutual Secure Sockets Layer (SSL) or Pretty Good Privacy (PGP) encryption as standard validation.

The network 220, whenever it receives a request from the service app server 120, may perform a variety of checks. For example, the network 220 may authenticate the service app server 120 using mutual SSL or PGP encryption. The network 220 may decrypt data from the authenticator app 150 using the network private encryption key 224. The network 220 may also verify the signature of any signed messages from the authenticator app 150 (e.g., via a public key of the user device 10 (FIG. 6)). In some implementations, the network 220 ensures that the service app ID matches an ID provided by the service app server and ensures that any authentication done by the authenticator app 150 is recent by, for example, comparing the timestamp captured by the authenticator app 150 to the current time. The network 220 may invalidate any operations that are sufficiently stale (e.g., to prevent replay attacks). Optionally, the network 220 maintains a whitelist of all service applications 140 authorized to access the consent architecture and the associated service app ID. The network 220 may maintain a repository of public keys of servers corresponding to the whitelisted service applications for proper server to server authentication.

In some implementations, the user 12 registers or initializes the user device 10 and the authenticator application 150 with the service application 140 prior to use. This registration provides for a strong binding between the device 10, a digital identify of the user 12 (which may be shared with the service application 140), and the actual identify of the user 12 (which may be shared with the remote entity 130 or network 220). In some examples, the authenticator application 150 is a trusted app. That is, the authenticator application 150 is trusted by the network 220 and/or the remote entity 130 to provide assertions of verified user information.

Figure 5B:
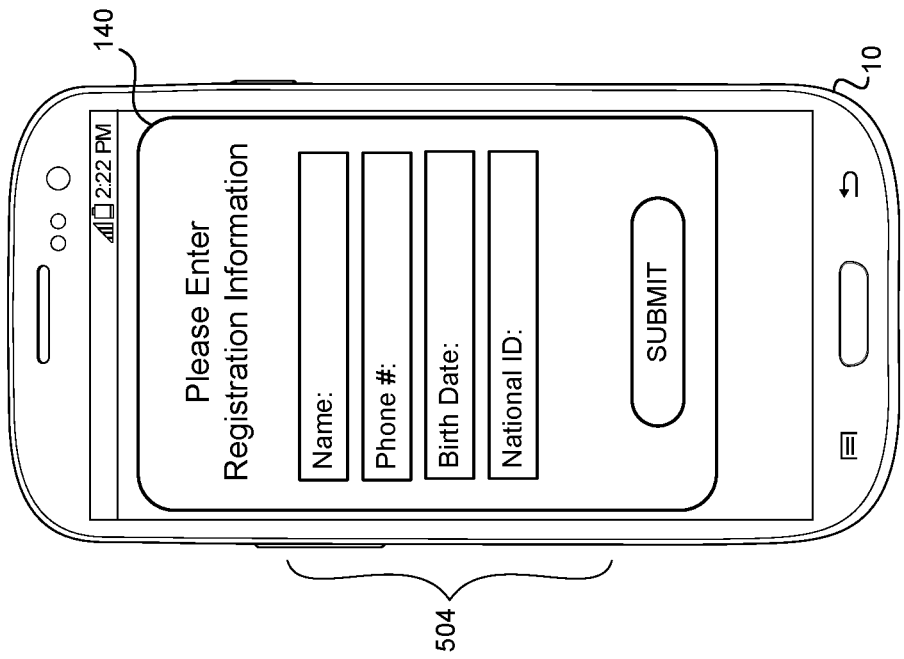
FIGS. 5A and 5B are schematic views of an example user device executing a service application.
Figure 5A:
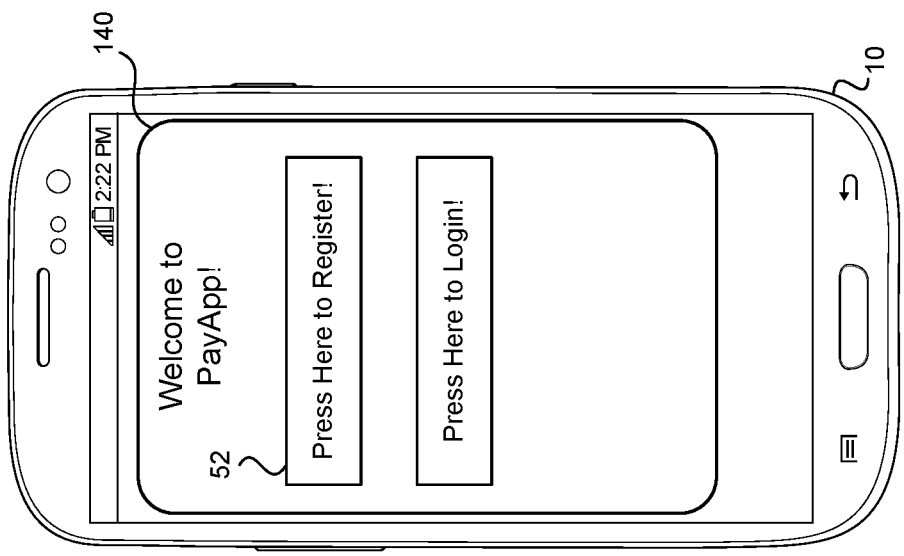

Referring now to FIG. 5A, registration of the service application 140 typically begins via a request from the user 12 (e.g., via actuating a user input 52 within the service application). The service application 140 collects various user information 504, such as name, phone number, a unique identifier, and/or any other user information the service application 140 desires for authentication (FIG. 5B). In some examples, the service application 140 verifies the user information 504 with the service application server 120, while in other examples the service application 140 has already pre-verified the information. For example, some service applications 140 may already have pre-verified phone numbers for some users. For some applications, the service application 140 may collect identification or identifying information that may be verified by, for example, by querying a central database.

Figure 6:
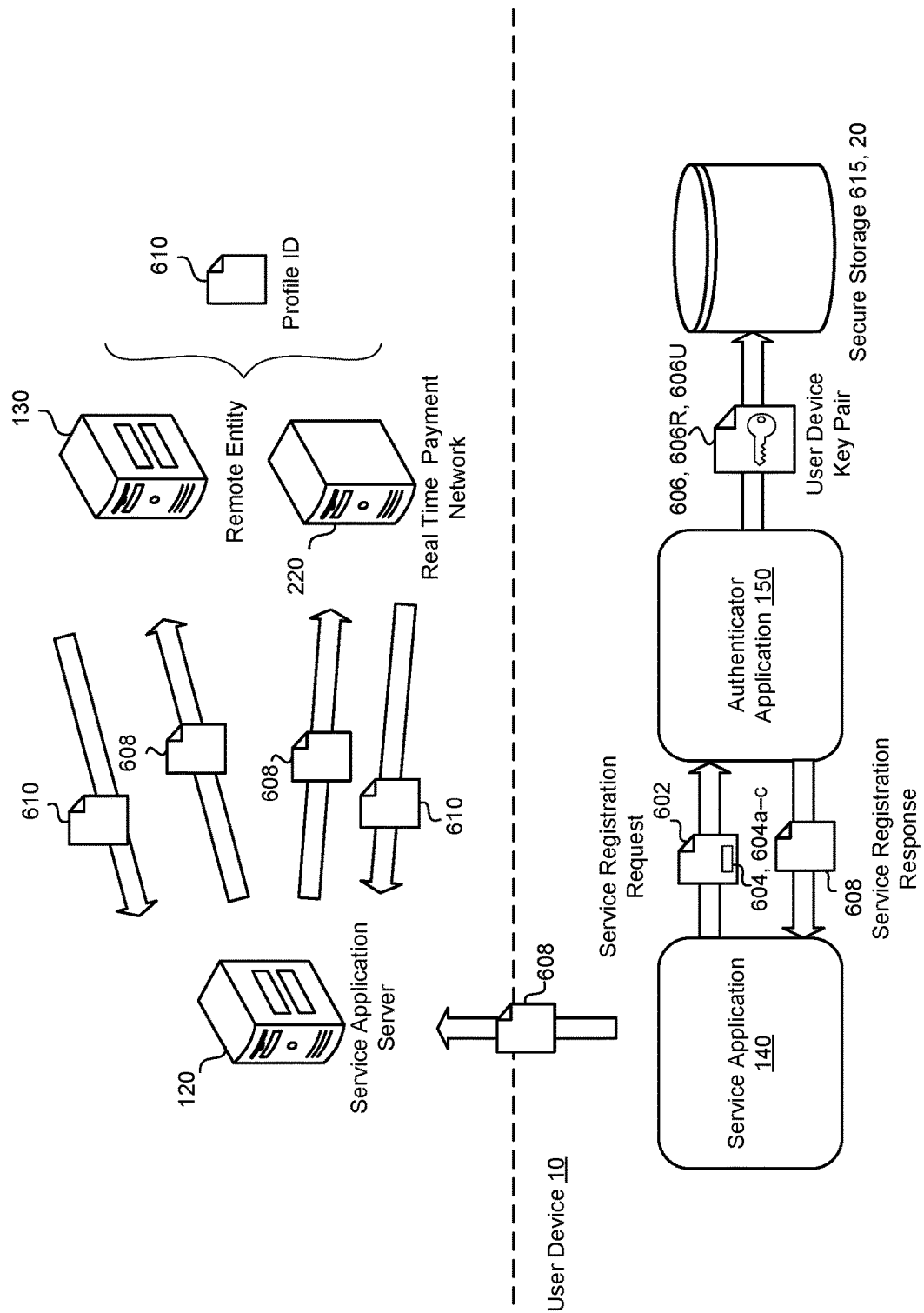
FIG. 6 is a schematic view of the authenticator application of FIG. 1 and a service registration request.

Referring now to FIG. 6, after collecting and verifying the user information 94, the service application 140 invokes the authenticator application 150 by sending a service registration request 602 that includes application registration information 604, 604a—c. This information 604 provides data that the authenticator application 150 uses to verify and authenticate the registration. For example, the registration information 604 may include the service application ID 604a, a user identification (user ID) 604b that uniquely identifies the user 12 in the service app 140 namespace (i.e., no other user of the service app 140 has the same user ID), and a consent identification nonce 604c. The service application ID 604a may be used to verify that the service application 140 is an authorized application. The consent identification nonce 604c may be used to combat replay attacks. The authenticator application 150 uses the user ID 604b, as discussed below, to generate unique, user-specific keys.

The authenticator app 150 receives the service registration request 602 and may perform the set of standard validations discussed above. The authenticator app 150 generates a unique device key pair 606 used to uniquely prove the identity of the device 10. A private key 606R of the key pair is stored in a secure element 615 within the device (e.g., within the memory hardware 20) while a corresponding public key 606U is provided to the public (e.g., the network 220 and/or remote entity 130). The secure element 616 ensures that any user or application of the device 10 cannot gain access to the private key 606R. The authenticator app 150 may generate the device keys 606 using the service application ID 604a, the user ID 604b, and unique device information (e.g., a serial number, etc.). In this way, the authenticator application 150 generates unique device keys 606 for each user of each service application 140.

Figure 7:
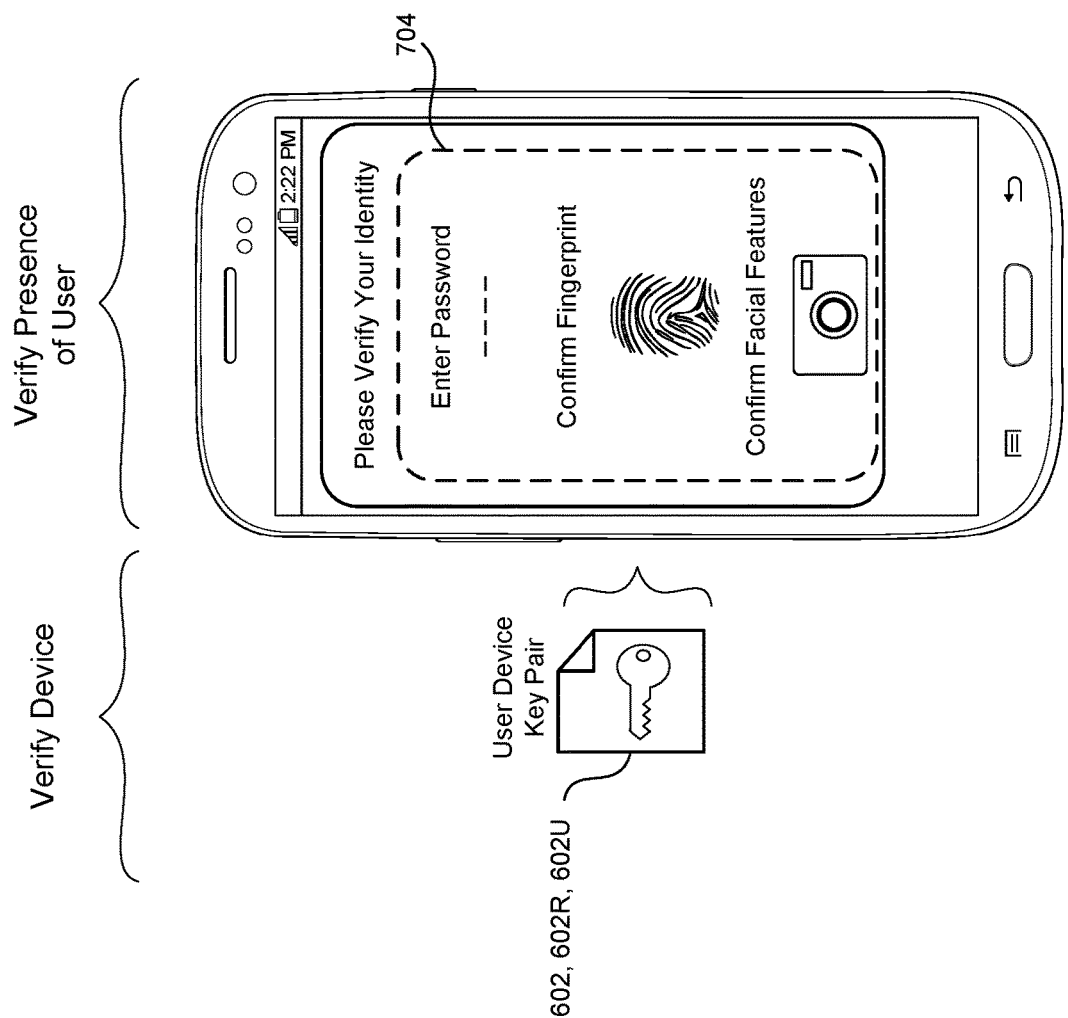
FIG. 7 is a schematic view of an example user device issuing challenges to a user to generate a device key pair.

Referring now to FIG. 7, in some examples, use of the private key 606R is protected by a user challenge 704. For example, before the user device 10 signs a message with the private key 606R (i.e., to authenticate the message), the user device 10 may prompt the user 12 to enter a password or provide another identifier usable to authenticate the user. Thus, messages signed by the device private key 606R inherently imply two factors of both user and device authentication.

Referring back to FIG. 6, the authenticator app 150, in some implementations, signs a service registration response 608 that includes the service app identification 604a, the consent nonce 604c, and/or any certificates of the service application 140 with the device private key 606R. The attestations by these keys may be provided by an operating system of the user device 10 to validate the integrity of the device and the strength and properties of the keys 606. The authenticator app 150 returns the signed response 608 (including the signed service application identification 604a) to the service app 140 which initiates a registration request with the service app server 120 (FIG. 1). The service app server 120 initiates a registration request with, in some examples, the network 220, and in other examples, with the remote entity 130. The service app server 120 sends the unique user ID 604b (or a unique derivative of it, e.g., a hash) that uniquely identifies the user 12 with the service application 140 to the network 220 (or the remote entity 130). Other verification information (e.g., phone number, unique identifier, the device public key 606U, etc.) may also be sent.

The network 220 or remote entity 130, after receiving the registration request, may perform the set of standard validations discussed above and verifies the properties of the device key 606R. The network 220 or remote entity 130, in response to successful validation, creates a profile ID 610 that includes an association between the user 12, the service app 140, and the device 10 (e.g., using service application ID 604a, the user ID 604b, the verified phone number, unique identifier, etc.) and sends the profile ID 610 back to the service app server 120, which stores the profile ID 610, thus completing user registration. The service app 140 may provide the user 12 confirmation of the successful registration. User registration allowed the network 220 and/or remote entity 130 to reliably establish that a digital identity defined by the service app 140 has possession of valid user information 604 (e.g., a verified phone number), possession of the user device 10, and consented to registration. The service app server 120 has stored the profile ID which associates the user 12 with the service app 140 and user information 604. The authenticator app 150 has stored the generated device keys 606 that are specific to the user 12 and the service app 140 that may be used as an attestation.

Figure 8B:
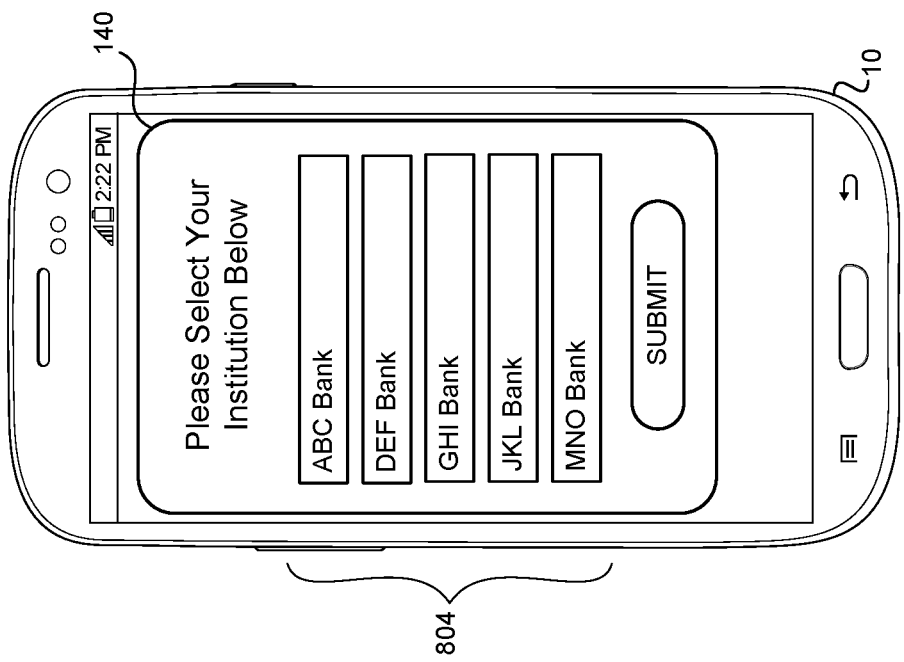
FIGS. 8A and 8B are schematic views of an example user device executing a service application offering account selection.
Figure 8A:
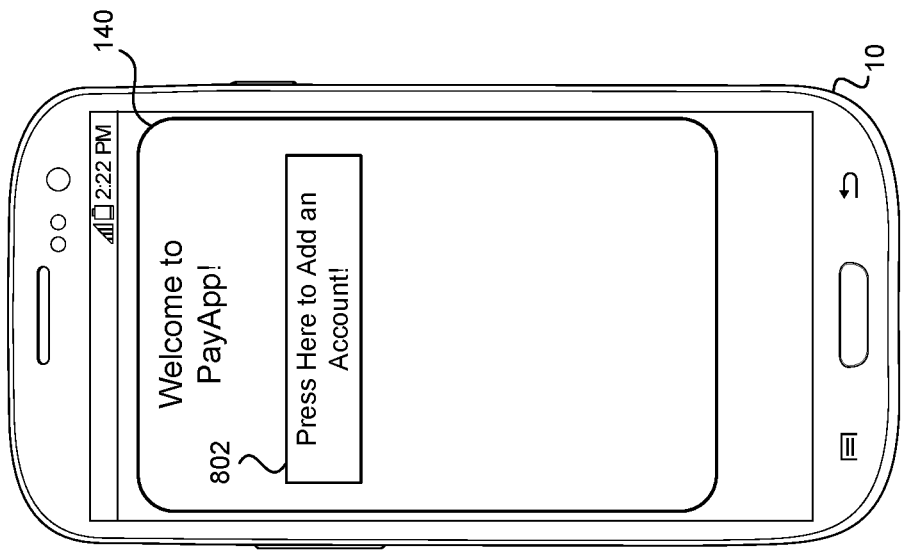

After user registration with the service app 140, the user 12, in some implementations, registers an account (or multiple accounts) with a remote entity 130 to establish a binding between the user device 10, the profile ID 610, and the associated account. Referring now to FIG. 8A, the user 12 creates an account registration request 902 (FIG. 9) by providing a user input indication 802 (e.g., selecting a graphical element displayed on a graphical user interface executing on the device 10). The service app 140 may respond by providing a valid institutions list 804 (FIG. 8B) for display on the graphical user interface for the user 12 to select from. The list 804 may be fetched from the service app server 120 or network 220 periodically and may include metadata such as name, logos, etc. The list 804 may be cached on the memory hardware 20 of the user device 10 between periodic updates. The user 12 may provide input indications using touch, stylus, speech, gesture, or any other input mechanism to select from the list 804 and/or providing the input indication 802 for initiating the account registration request 902.

Figure 9:
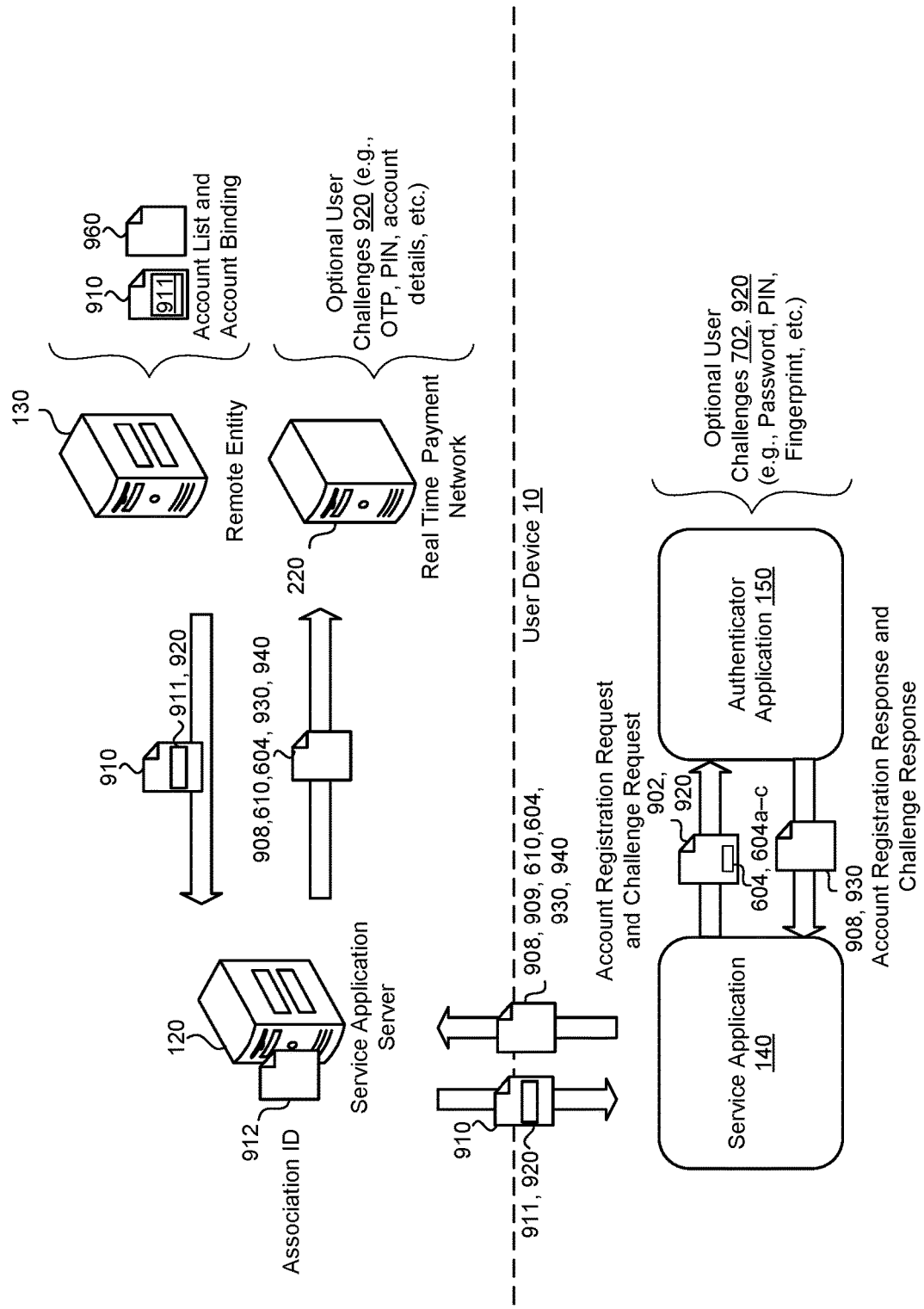
FIG. 9 is a schematic view of an authenticator application of FIG. 1 and an account registration request.

Referring now to FIG. 9, in some implementations, the service app 140 requests verification of device ownership from the authenticator app 150 by sending the account registration request 902 to the authenticator app 150. The account registration request 902 includes at least the user ID 604b. The authenticator app 150 may perform the aforementioned standard validations which establish that the account binding request (i.e., the account registration request 902) originated from the same device 10 that performed the associated user registration (see FIG. 6). The authenticator app 150 signs (with the device key 606R as shown in FIG. 6) an account registration response 908 that includes, for example, an identifier of the service app 140 and the current timestamp, establishing a factor of device possession. The authenticator app 150, in some examples, further issues a challenge 702 to the user (FIG. 7) to establish a second factor of knowledge or inherence. The signed account registration response 908 is returned to the service app 140.

The service app 140, in some implementations, requests the network 220 or the remote entity 130 to list the user's 12 associated accounts by sending the signed response 908, the profile ID 610, and identification of the remote entity 130 (when sending to the network 220) via, for example, the service application server 120. The network 220 or remote entity 130 may perform its standard validations and verifies any application user information 604 (e.g., the verified phone number, the unique identifier, etc.). In some examples, the network 220 passes a request to list applicable accounts (i.e., accounts belonging to the user 12) along with passing any necessary identification data (e.g., the phone number or unique identifier) to the remote entity 130. The remote entity 130 may return an account list 910 back to the service app server 120, whereby the account list 910 is associated with the user based on the identification data. The account list 910 may include additional metadata 911, such as a name associated with the account, account name, account reference ID, and at least a portion of a unique account identifier (e.g., the last four digits of the account number). Optionally, the remote entity 130 can issue additional challenges 920 at this point. For example, the remote entity 130 may request a one-time password (via short message service (SMS), email, hardware-based, etc.), a password or personal identification number (PIN), specific account details, etc. In some implementations, such a challenge is triggered if one factor matches, but a different factor does not. For example, identification from an external database (e.g., the unique identifier) of the user matches, but the phone number does not. This may initiate "Yellow Path" authentication (i.e., authentication that requires additional verification). Challenges may be encrypted for additional security. For example, the challenges may be encrypted using a session key from a DH key exchange.

The service app server 120 relays the account list 910 to the service app 140 executing on the user device 10 for display to the user 12. In some implementations, the user 12 selects a particular account from the account list 910 associated with the user 12. The user 12, in some implementations, selects all available accounts. The service app 140 may again verify device ownership from the authenticator app 150 and capture any data necessary to satisfy challenges from the remote entity 130. In this case, the service app 140 passes the user ID 604b and the signed remote entity encryption key to encrypt the challenge data. After again performing any standard validations, the authenticator app 150 challenges the user (e.g., requests the user to unlock the user device, enter a password, etc.) to confirm possession and issue any challenge data from the remote entity. The authenticator app 150 encrypts any challenge results, a current timestamp, and the service app ID with the remote entity 130 key and signs the encrypted challenge response 930.

The authenticator app 150 passes the signed and encrypted response 930 to the service app 140, which in turn passes it and a binding request 940 to the service app server 120. The service app server 120 passes the data to the network 220 or the remote entity 130 along with the profile ID 610, remote entity ID, and any necessary account ID 909 (i.e., an identification that uniquely identifies the selected account). The service app server 120 may also generate an association ID 912 to represent the account binding and pass this ID 912 to the network 220/remote entity 130 as well. The remote entity 130 receives the binding request 940 (from either the network 220 or the service app server 120) and decrypts and verifies any challenge data. The remote entity 130 then stores the binding 960 between the selected account(s) and the device public key 606U and represented by the association ID. The remote entity 130 may note any details about any issued challenges to help with authentication during transactions (e.g., yellow path, green path, etc.). The remote entity may store the device public key 606U so that the remote entity 130 may verify device attestations prior to or during future transactions.

Thus, during account registration, the remote entity 130 stores a binding 960 between the remote entity account ID and the device public key 606U represented by the association ID 912. The authenticator app 150 has registered a key pair 606 that represents this binding and any future attestations signed by the private key 606R of the key pair provides proof of device ownership as well as a second factor of inherence. The service app server 120 stores a variety of data regarding the binding. For example, the service app server 120 may store the association ID, remote entity account metadata, the profile ID 610, the user ID 604b, and the device ID. In this way, the authenticator app 150 securely passes data to the network 220 and the remote entity 130 while simultaneously ensuring that the network 220 and the remote entity 130 may verify that any data was captured on the device registered during user registration.

Figure 10:
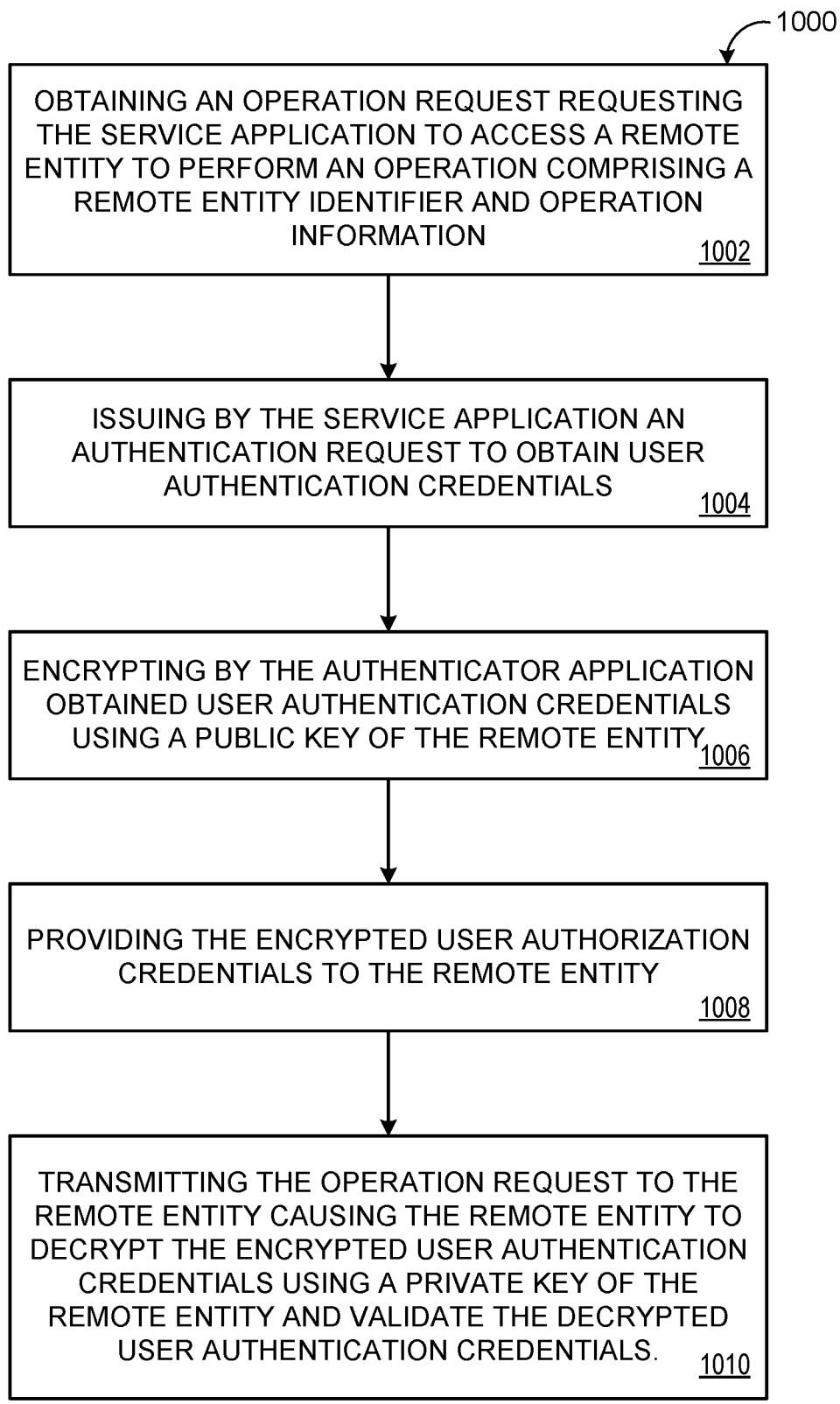
FIG. 10 is a flowchart of an example arrangement of operations for a method of providing an authenticator application in consent architecture.

FIG. 10 is a flowchart of an exemplary arrangement of operations for a method 1000 of authenticating operations within consent architecture. The method 1000 starts at operation 1002 with obtaining, at data processing hardware 30 of a user device 10 executing a service application 140 and an authenticator application 150, an operation request 142 requesting the service application 140 to access a remote entity 130 to perform an operation 138. The operation request 142 includes a remote entity identifier 142a identifying the remote entity 130 and operation information 142b associated with the operation 138. At operation 1004, the method 1000 includes issuing, by the service application 140 executing on the data processing hardware 30, an authentication request 152 requesting the authenticator application 150 to obtain user authentication credentials 154 of a user 12 of the user device 10 associated with the remote entity 130 for authenticating the user 12 before the remote entity 130 performs the operation 138.

At operation 1006, the method 1000 includes encrypting, by the authenticator application 150 executing on the data processing hardware 30, the obtained user authentication credentials 154 using a public key 132 of the remote entity 130. The service application 140 is restricted from obtaining the user authentication credentials 154 in unencrypted form. At operation 1008, the method 1000 also includes providing, by the authenticator application 150 executing on the data processing hardware 30, the encrypted user authentication credentials 154 to the service application 140, and at operation 1010, the method 1000 includes transmitting, by the service application 140 executing on the data processing hardware 30, the operation request 142 to the remote entity 130. The operation request 142 includes the encrypted user authentication credentials 154. The operation request 142, when received by the remote entity 130, causes the remote entity 130 to decrypt the encrypted user authentication credentials 154 using a private key 133 of the remote entity 130 and validate the decrypted user authentication credentials 154.

Figure 11:
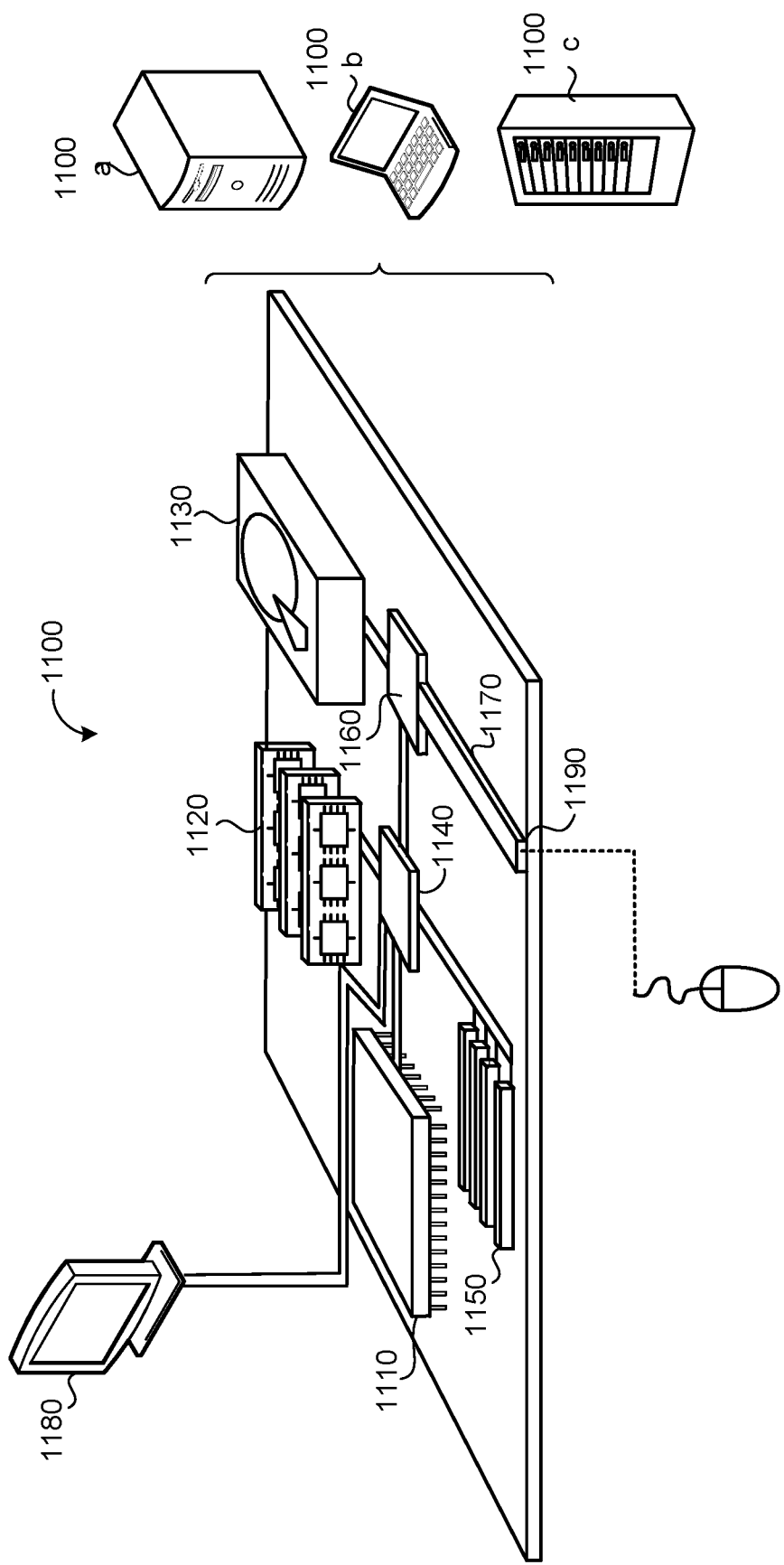
FIG. 11 is a schematic view of an example computing device that may be used to implement the systems and methods described herein.

FIG. 11 is schematic view of an example computing device 1100 that may be used to implement the systems and methods described in this document. The computing device 1100 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1100 includes a processor 1110, memory 1120, a storage device 1130, a high-speed interface/controller 1140 connecting to the memory 1120 and high-speed expansion ports 1150, and a low speed interface/controller 1160 connecting to a low speed bus 1170 and a storage device 1130. Each of the components 1110, 1120, 1130, 1140, 1150, and 1160, are interconnected using various busses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display 1180 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1100a or multiple times in a group of such servers 1100a, as a laptop computer 1100b, or as part of a rack server system 1100c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
obtaining, at data processing hardware of a user device executing a service application and an authenticator application, an operation request requesting the service application to access a remote entity to perform an operation, the operation request comprising:
a remote entity identifier identifying the remote entity; and
operation information associated with the operation;
issuing, by the service application executing on the data processing hardware, an authentication request requesting the authenticator application to obtain user authentication credentials of a user of the user device associated with the remote entity for authenticating the user before the remote entity performs the operation;
encrypting, by the authenticator application executing on the data processing hardware, the obtained user authentication credentials using a public key of the remote entity so that the service application is restricted from obtaining the user authentication credentials in unencrypted form;
providing, by the authenticator application executing on the data processing hardware, the user authentication credentials encrypted by the authenticator application to the service application; and
transmitting, by the service application executing on the data processing hardware, to the remote entity, the operation request and the user authentication credentials encrypted by the authenticator application, the operation request and the user authentication credentials encrypted by the authenticator application when received by the remote entity causing the remote entity to:
decrypt the user authentication credentials using a private key of the remote entity; and
validate the user authentication credentials decrypted by the remote entity.

2. The method of claim 1, wherein:
the service application comprises a payment application;
the remote entity comprises a financial institution associated with the user; and
the operation request requesting the service application to access the remote entity comprises an electronic payment request requesting the payment application to initiate an electronic payment from the financial institution to a payee.

3. The method of claim 2, wherein the operation information comprises at least one of a description of the electronic payment, a value/amount of the electronic payment, at least a portion of a unique account identifier identifying an account associated with the user at the financial institution, or a payee identifier identifying the payee.

4. The method of claim 1, wherein:
the remote entity comprises a records datastore storing private information associated with the user; and
the operation request requesting the service application to access the remote entity comprises an information retrieval request requesting the service application to retrieve at least some of the private information from the records datastore.

5. The method of claim 4, wherein the private information comprises private records associated with the user.

6. The method of claim 1, further comprising, after encrypting the obtained user authentication credentials using the public key of the remote entity, re-encrypting, by the authenticator application executing on the data processing hardware, the user authentication credentials using a public key associated with a verification network of the remote entity.

7. The method of claim 1, further comprising, after encrypting the obtained user authentication credentials using the public key of the remote entity, signing, by the authenticator application executing on the data processing hardware, the user authentication credentials using a private key of the user device.

8. The method of claim 7, wherein a public key of the user device is registered with the remote entity, the public key of the user device corresponding to the private key of the user device and used by the remote entity for verifying a signature of the user authentication credentials.

9. The method of claim 1, wherein encrypting the obtained user authentication credentials using the public key of the remote entity further comprises encrypting the operation request and the user authentication credentials together using the public key of the remote entity.

10. The method of claim 1, further comprising, prior to encrypting the obtained user authentication credentials, issuing, by the authenticator application executing on the data processing hardware, a user device unlock challenge to the user.

11. The method of claim 1, wherein the authentication request issued by the service application comprises an authorization token that the authenticator application uses to validate the service application prior to obtaining the user authentication credentials.

12. The method of claim 1, further comprising, after transmitting the operation request and the user authentication credentials to the remote entity:
  receiving, at the service application executing on the data processing hardware, a challenge request from the remote entity, the challenge request requesting additional user authentication credentials from the user;
  invoking, by the service application executing on the data processing hardware, the authenticator application to obtain the additional user authentication credentials from the user;
  encrypting, by the authenticator application executing on the data processing hardware, the obtained additional user authentication credentials using the public key of the remote entity;
  providing, by the authenticator application executing on the data processing hardware, the additional user authentication credentials encrypted by the authenticator application to the service application; and
  transmitting, by the service application executing on the data processing hardware, a challenge response comprising the additional user authentication credentials to the remote entity, the challenge response, when received by the remote entity, causing the remote entity to:
    decrypt the additional user authentication credentials using the private key of the remote entity; and
    validate the additional user authentication credentials decrypted by the remote entity.

13. The method of claim 12, wherein the remote entity is configured to perform an operation based on the operation request after validating both the user authentication credentials and the decrypted additional user authentication credentials.

14. The method of claim 1, wherein the remote entity is configured to transfer an electronic payment to a payee after validating the user authentication credentials.

15. The method of claim 1, further comprising binding, by the authenticator application executing on the data processing hardware, an identity of the user to the user device, the binding comprising:
  receiving a service registration request from the service application executing on the data processing hardware, the service registration request comprising a user identification and a service application identification, the user identification uniquely identifying the user to the service application and the service application identification uniquely identifying the service application to the authenticator application;
  generating a device bound key pair, the device bound key pair comprising a device public key and a device private key based on the user identification and the service application identification;
  signing the service application identification with the device private key; and
  sending the device public key and the signed service application identification to the remote entity.

16. The method of claim 15, further comprising binding, by the authenticator application executing on the data processing hardware, a user account associated with the user and the remote entity with the user device, the binding comprising:
  signing the service application identification with the device private key; and
  sending the signed service application identification to the service application executing on the data processing hardware, the signed service application identification when received by the service application causing the service application to send the signed service application identification and an account identification to the remote entity, the account identification uniquely identifying the user account.

17. The method of claim 1, further comprising, when executing the service application and the authenticator application:
  executing, by the data processing hardware, one or more additional service applications, each additional service application configured to:
    receive a corresponding operation request requesting the additional service application to access the same remote entity or a different remote entity to perform a corresponding operation;
    issue a corresponding authentication request requesting the authenticator application to obtain the user authentication credentials of the user for authenticating the user before the same remote entity or a different remote entity performs the operation; and
    receive the user authentication credentials from the authenticator application so as to restrict the additional service application from obtaining the user authentication credentials in unencrypted form.

18. A system comprising:
  data processing hardware of a user device executing a service application and an authenticator application; and
  memory hardware in communication with the data processing hardware, the memory hardware storing instructions that when executed on the data processing hardware cause the data processing hardware to perform operations comprising:
    obtaining an operation request requesting the service application to access a remote entity to perform an operation, the operation request comprising:
      a remote entity identifier identifying the remote entity; and
      operation information associated with the operation;
    issuing, by the service application, an authentication request requesting the authenticator application to obtain user authentication credentials of a user of the user device associated with the remote entity for authenticating the user before the remote entity performs the operation;
    encrypting, by the authenticator application, the obtained user authentication credentials using a public key of the remote entity, so that the service application is restricted from obtaining the user authentication credentials in unencrypted form;
    providing, by the authenticator application, the user authentication credentials encrypted by the authenticator application to the service application; and transmitting, by the service application, to the remote entity, the operation request and the user authentication credentials encrypted by the authenticator application, the operation request and the user authentication credentials encrypted by the authenticator application when received by the remote entity causing the remote entity to:
  decrypt the user authentication credentials using a private key of the remote entity; and
  validate the user authentication credentials decrypted by the remote entity.

19. The system of claim 18, wherein:
the service application comprises a payment application;
the remote entity comprises a financial institution associated with the user; and
the operation request requesting the service application to access the remote entity comprises an electronic payment request requesting the payment application to initiate an electronic payment from the financial institution to a payee.

20. The system of claim 19, wherein the operation information comprises at least one of a description of the electronic payment, a value/amount of the electronic payment, at least a portion of a unique account identifier identifying an account associated with the user at the financial institution, or a payee identifier identifying the payee.

21. The system of claim 18, wherein:
the remote entity comprises a records datastore storing private information associated with the user; and
the operation request requesting the service application to access the remote entity comprises an information retrieval request requesting the service application to retrieve at least some of the private information from the records datastore.

22. The system of claim 21 wherein the private information comprises private records associated with the user.

23. The system of claim 18, further comprising, after encrypting the obtained user authentication credentials using the public key of the remote entity, re-encrypting, by the authenticator application, the user authentication credentials using a public key associated with a verification network of the remote entity.

24. The system of claim 18, further comprising, after encrypting the obtained user authentication credentials using the public key of the remote entity, signing, by the authenticator application, the user authentication credentials using a private key of the user device.

25. The system of claim 24, wherein a public key of the user device is registered with the remote entity, the public key of the user device corresponding to the private key of the user device and used by the remote entity for verifying a signature of the user authentication credentials.

26. The system of claim 18, wherein encrypting the obtained user authentication credentials using the public key of the remote entity further comprises encrypting the operation request and the user authentication credentials together using the public key of the remote entity.

27. The system of claim 18, further comprising, prior to encrypting the obtained user authentication credentials, issuing, by the authenticator application, a user device unlock challenge to the user.

28. The system of claim 18, wherein the authentication request issued by the service application comprises an authorization token that the authenticator application uses to validate the service application prior to obtaining the user authentication credentials.

29. The system of claim 18, wherein the operations further comprise, after transmitting the operation request and the user authentication credentials to the remote entity:
  receiving, at the service application, a challenge request from the remote entity, the challenge request requesting additional user authentication credentials from the user;
  invoking, by the service application, the authenticator application to obtain the additional user authentication credentials from the user;
  encrypting, by the authenticator application, the obtained additional user authentication credentials using the public key of the remote entity;
  providing, by the authenticator application, the additional user authentication credentials encrypted by the authenticator application to the service application; and
  transmitting, by the service application, a challenge response comprising the additional user authentication credentials to the remote entity, the challenge response, when received by the remote entity, causing the remote entity to:
    decrypt the additional user authentication credentials using the private key of the remote entity; and
    validate the additional user authentication credentials decrypted by the remote entity.

30. The system of claim 29, wherein the remote entity is configured to perform an operation based on the operation request after validating both the user authentication credentials and the decrypted additional user authentication credentials.

31. The system of claim 18, wherein the remote entity is configured to transfer an electronic payment to a payee after validating the user authentication credentials.

32. The system of claim 18, further comprising binding, by the authenticator application, an identity of the user to the user device, the binding comprising:
  receiving a service registration request from the service application, the service registration request comprising a user identification and a service application identification, the user identification uniquely identifying the user to the service application and the service application identification uniquely identifying the service application to the authenticator application;
  generating a device bound key pair, the device bound key pair comprising a device public key and a device private key based on the user identification and the service application identification;
  signing the service application identification with the device private key; and
  sending the device public key and the signed service application identification to the remote entity.

33. The system of claim 32, further comprising binding, by the authenticator application, a user account associated with the user and the remote entity with the user device, the binding comprising:
  signing the service application identification with the device private key; and
  sending the signed service application identification to the service application, the signed service application identification when received by the service application causing the service application to send the signed service application identification and an account identification to the remote entity, the account identification uniquely identifying the user account.

34. The system of claim 18, wherein the operations further comprise, when executing the service application and the authenticator application:

executing one or more additional service applications, each additional service application configured to:
  receive a corresponding operation request requesting the additional service application to access the same remote entity or a different remote entity to perform a corresponding operation;
  issue a corresponding authentication request requesting the authenticator application to obtain the user authentication credentials of the user for authenticating the user before the same remote entity or a different remote entity performs the operation; and
  receive the user authentication credentials from the authenticator application so as to restrict the additional service application from obtaining the user authentication credentials in unencrypted form.

* * * * *